United States Patent Office 2,808,431
Patented Oct. 1, 1957

2,808,431

PURIFICATION OF CRUDE NAPHTHENIC ACID MIXTURES

William L. Fierce, Algonquin, Ill., assignor to The Pure Oil Company, Chicago, Ill., a corporation of Ohio No Drawing. Application October 26, 1955,
Serial No. 543,007

5 Claims. (Cl. 260—514)

The present invention relates to a process for the purification of crude naphthenic acid mixtures and, more particularly, to a solvent composition for obtaining naphthenic acids in a highly pure state with a limited number of extractions employing simple apparatus.

It is known that naphthenic acids can be extracted from petroleum stocks by a variety of solvents. Naphthenic acids found in lubricating oils and fractions thereof are generally characterized as being high molecular weight carboxylic acids, liquid or solid in form, and having aliphatic and alicyclic nuclei of more than 25 carbon atoms to the molecule, showing little or no unsaturation and consisting essentially of cyclic acids and polycyclic acids. These acidic materials have boiling ranges above about 800° F. and, as found in the development of the present invention, offer difficulty in their adequate purification. In removing these materials from crude oils, the acids are often recovered in the form of a crude product containing from 25% to 75% oil. Market value is vastly increased by separating the acids from the remaining oil. The use of selective solvents which are capable of preferentially dissolving the acids or their salts is applied in purification methods. To attain the desired selectivity and separation, it is usually necessary to apply several extraction stages or countercurrent contacting techniques and elaborate refluxing. Such a process, in which a solvent comprising water-miscible polar organic liquids is used, is described in McCorquodale Patent 2,391,729. Other solvents used for this purpose are mixtures of polar organic liquids with sufficient water to make the composition incompletely miscible with the naphthenic acids. Mixtures of methanol and water, organic acids and water, and mixtures of alcohols have been used.

Some of the difficulties, such as changes in the composition of more volatile components, are overcome by control of extraction temperature as by internal refluxing in the extraction zone by cooling the solvent phase as it passes through the extract enriching section in accordance with Honeycutt in Patent 2,610,209. The art also teaches that ammonia, although a poor solvent when used alone, may be modified by using high percentages of modifying agents such as alcohols and amines for various separations of components of different molecular weights. Such a process is described in Sweeney, Patent 2,396,299, being applicable to the separation of diolefins from monoolefins, olefins from paraffins and aromatics from paraffins, etc., again using countercurrent extraction techniques.

According to the present invention, it has been found that naphthenic acids of high molecular weight as hereinabove defined may be purified quite simply by a single step extraction with a two-phase solvent composition comprising a volatile non-polar solvent phase, such as an aliphatic liquid hydrocarbon, and a polar phase comprising a volatile lower molecular weight alcohol containing minor amounts of ammonia and water. By the method of this invention it has been found that the naphthenic acids are concentrated in the polar phase and the oil is concentrated in the non-polar phase by the simple expedient of using only one stage, without the necessity of neutralization and separation step to remove the free acids. Further, the oil phase need not be washed to remove any dissolved caustics as in prior art methods. In the present method both the oil and the acids can be recovered uncontaminated simply by stripping out the ammonia and the alcohol. Although the invention will be described by reference to the purification of naphthenic acids taken from particular lubricating oil fractions, it is not to be so limited and will find application in related arts wherein the purification of naphthenic acids and related materials of high molecular weight is the main consideration.

Accordingly, the primary object of the invention is to provide a process for the purification of naphthenic acids of high molecular weight by solvent extraction with a two-phase solvent.

Another object of the invention is to provide a simple one-stage process for purifying high molecular weight naphthenic acids by solvent extraction with a solvent composition comprising a major portion of a non-polar phase and a minor portion of a polar phase with small amounts of a basic agent and water.

These and further objects of the invention will become obvious as the description thereof proceeds.

In general, the purification method of this invention involves partitioning the crude naphthenic acids in the polar phase of the two-phase solvent by simple batch contacting techniques. The polar phase is separated and the naphthenic acids recovered merely by removing the volatile polar solvent. The process may be used in continuous countercurrent extraction processes with great facility, eliminating the necessity of internal refluxing, the use of plural stages, or re-extraction of either extract or raffinate.

In order to illustrate the invention, the following example is given:

EXAMPLE I

A supply of crude naphthenic acids with an acid number of 94 was obtained by the solvent extraction of a phenol extract of an 85 VIS neutral oil. 9.3 g. of the crude acids were treated with a two-phase solvent comprising 13.0 ml. concentrated ammonium hydroxide, 39.0 ml. of methanol and 54.0 ml. of hexane. This solvent composition contained about 50.94 volume percent of hexane, 36.79 volume percent methanol, 3.43 volume percent of ammonia and about 8.83 volume percent water. After thorough mixing, the phases were separated into an upper hexane phase and a lower alcohol phase. The oil contained in the hexane phase was recovered by stripping off the volatile solvent by the use of heat and vacuum, and was found to have an acid number of 29.9. The lower alcohol phase was subjected to a similar stripping procedure to separate 5.2 grams of the purified naphthenic acids. On analysis these acids were found to have an acid number of 144, which represents a recovery of about 86% of the acids. The naphthenic acids from this stock are known to have an acid number of 160 when thoroughly purified. Accordingly, naphthenic acids of 90% purity were obtained with only one extraction stage.

EXAMPLE II

The partition method of this invention was applied to crude napthenic acids from three different neutral lubricating oils using the solvent composition and technique outlined in Example I. Some of the properties of the naphthenic acids produced are given in Table I.

Table I

|  | Acids derived from— | | |
|---|---|---|---|
|  | 85 VIS Neutral | 170 VIS Neutral | 350 VIS Neutral |
| Neutralization Number | 159 | 134 | 124 |
| Percent Unsaponifiable | 2.6 | 2.9 | 1.2 |
| Vis. SUS at 210° F | 159.0 | 347.7 | 597.0 |
| Refractive Index | 1.4974 | 1.5060 | 1.5139 |
| Average Molecular Weight of Deoiled Acids | 344 | 406 | 447 |

EXAMPLE III

In order to further demonstrate the invention and the effect of varying the constituents in the solvent composition the crude acids described in Example I were treated with the following two-phase solvents:

Table II

|  | Composition of Solvents | | | | | |
|---|---|---|---|---|---|---|
|  | No. 1 | | No. 2 | | No. 3 | |
|  | Parts by Vol. | Vol. Percent | Parts by Vol. | Vol. Percent | Parts by Vol. | Vol. Percent |
| Conc. NH₄OH (28%) | 1.0 | 8.4 | 1.0 | 12.5 | 0.5 | 6.25 |
| Water (added) |  |  |  |  | 0.5 | 6.25 |
| Methanol | 7.0 | 58.3 | 1.5 | 18.75 | 1.5 | 18.75 |
| 2-propanol |  |  | 1.5 | 18.75 | 1.5 | 18.75 |
| N-hexane | 4.0 | 33.3 | 4.0 | 50.0 | 4.0 | 50.0 |

When the phases were separated and the solvents were removed, the results were as follows:

Table III

|  | No. 1 | No. 2 | No. 3 |
|---|---|---|---|
| Weight crude acids grams | 9.4 | 9.5 | 9.3 |
| Weight purified acids recovered do | 5.8 | 5.2 | 5.2 |
| Percent acids recovered | 97 | 87 | 89 |
| Acid No. of purified acids | 148 | 149 | 150 |

The results obtained from these experiments show that the recovery of purified naphthenic acids can be increased by increasing the volume of the polar portion of the solvent, as in solvent No. 1, above. The results obtained with solvent No. 2 indicate that the solvent of Example I can be modified by the substitution of 2-propanol for part of the methanol without harmful effects. According to the results obtained with solvent No. 3, equally good results are obtained when the amount of ammonia present is decreased by 50%.

EXAMPLE IV

To show the effect of omitting the ammonium hydroxide or substituting potassium hydroxide the following experiments were conducted:

9.65 g. of same crude acids as in Example I were contacted with a solvent comprising 54 ml. methanol mixed with 54 ml. n-hexane. A single phase resulted. When 9.0 ml. water was added two phases separated. This was designated "extraction 4." In another experiment 8.76 g. of the crude acids were extracted with a solvent composition comprising 20 ml. 5.0 N KOH, 39 ml. methanol, and 54 ml. n-hexane. Two phases resulted, which were separated. This was designated "extraction 5." The results were as follows:

Table IV

|  | Extraction 4 | Extraction 5 |
|---|---|---|
| Weight original sample grams | 9.65 | 8.76 |
| Acid No. original sample | 94 | 94 |
| Weight material extracted grams | 0.44 | 0.27 |
| Acid No. material extracted | 124 | 114 |
| Percent acids extracted | 6.1 | 3.8 |
| Acid No. material in n-hexane phase | 91.5 | 93.3 |

The results shown in Table IV indicate that omitting ammonium hydroxide or substituting potassium hydroxide gives poor results when comparing the acid number of the purified product, which is the most important consideration.

Besides affording immediate phase separation, the use of the non-polar solvent phase allows the process to be carried out at ambient temperatures. Because of the viscosity of the crude naphthenic acid mixture elevated temperatures would be required to get adequate contact if the non-polar ingredient were omitted. In addition, with some crude naphthenic acid mixtures only one phase would result without the non-polar ingredient in the solvent composition and purification would therefore not be effected.

Although the concentration of ingredients in the solvent may vary somewhat, such variations should be correlated with the naphthenic acid concentration of the mixture to be treated, the solvent-oil ratios used and other conditions that may be varied or influence the degree of extraction. In general, the ammonia concentration should be at least sufficient to neutralize the naphthenic acids and preferably should be present in excess of the stoichiometric amount needed to neutralize the acids. Variation in the solvent-to-oil ratios may be used to control the degree of neutralization of naphthenic acids by the ammonia. Thus, where the ammonia concentration is high, solvent/oil ratios of 1/8 to 1/10 may be used and where the ammonia concentration is low, solvent/oil ratios of 10/1 to 8/1 may be used. These general limits of solvent/oil ratio will apply to the purification of most crude naphthenic acid mixtures encountered. In the extreme case involving very high or low naphthenic acid concentrations further variation of solvent/oil ratio is within the skill of the art.

The general limits of the concentrations of the various ingredients of the solvent compositions of this invention shown in Table V take into account the above considerations.

Table V

| | Composition in vol. percent |
|---|---|
| Non-polar solvent | 10 to 74 |
| Polar Solvent | 89.5 to 10 |
| Base as NH₄OH | 0.5 to 5.0 |
| Water | 0 to 11.0 |

The non-polar solvent may comprise any liquid organic solvent which has a dielectric constant of less than about 5. Specific examples include n-hexane, n-heptane, n-octane, petroleum naphthas, and the like. The non-polar solvent should be volatile, that is, boiling in the range of about 100 to 600° F. The polar solvent may comprise any liquid organic solvent having a dielectric constant greater than about 10, including, for example, such solvents as methanol, ethanol, 2-propanol, and other oxygen-containing organic materials. Mixtures of two or more of both the non-polar and polar solvents may be used. The polar and non-polar solvents should be substantially immiscible to insure adequate phase separation.

Having thus described the invention the only limitations attaching thereto appear in the appended claims.

What is claimed is:

1. The process for the purification of crude naphthenic acids which comprises treating said crude naphthenic acids with a solvent consisting of 10% to 74% by volume of a hydrocarbon selected from the group of n-hexane, n-heptane, n-octane, petroleum naphtha and their mixtures, 89.5% to 10% by volume of an alcohol selected from the group of methanol, ethanol, 2-propanol and their mixtures, 0.5% to 5.0% by volume of ammoniacal base and 0.0% to 11.0% by volume of water, allowing the resultant mixture of solvent and naphthenic acids to separate into an upper hydrocarbon solvent phase and a lower alcohol phase and separating the alcohol and ammonia from said alcohol phase to recover the purified acids having an acid number of at least about 148.

2. The process in accordance with claim 1 in which the solvent has the following ingredients and composition in volume percent: 33.3% n-hexane, 58.3% methanol, and 8.4% concentrated ammonium hydroxide.

3. The process in accordance with claim 1 in which the solvent has the following ingredients and composition in volume percent: 50.0% n-hexane, 18.75% methanol, 18.75% 2-propanol, and 12.5% concentrated ammonium hydroxide.

4. The process in accordance with claim 1 in which the solvent has the following ingredients and composition in volume percent: 50.0% n-hexane, 18.75% methanol, 18.75% 2-propanol, 6.25% concentrated ammonium hydroxide and 6.25% water.

5. The process in accordance with claim 1 in which the solvent has the following ingredients and composition in volume percent: 50.94% n-hexane, 36.79% methanol, 3.43% ammonia and 8.83% water.

References Cited in the file of this patent

UNITED STATES PATENTS

| | | |
|---|---|---|
| 2,003,640 | Wunsch | June 4, 1935 |
| 2,186,249 | Lazar et al. | Jan. 9, 1940 |
| 2,600,537 | Honeycutt | June 17, 1952 |